(12) United States Patent
Yoshida

(10) Patent No.: US 7,512,502 B1
(45) Date of Patent: Mar. 31, 2009

(54) METHOD AND APPARATUS FOR ANALYZING DEFORMATION AND PREDICTING FAILURE IN SOLID-STATE OBJECTS

(75) Inventor: Sanichiro Yoshida, Hammond, LA (US)

(73) Assignee: Southeastern Louisiana University, Hammond, LA (US)

( * ) Notice: Subject to any disclaimer, the term of this patent is extended or adjusted under 35 U.S.C. 154(b) by 0 days.

(21) Appl. No.: 11/563,751

(22) Filed: Nov. 28, 2006

(51) Int. Cl.
*G01L 5/00* (2006.01)
(52) U.S. Cl. ...................................... 702/42
(58) Field of Classification Search .................... 702/42
See application file for complete search history.

(56) References Cited

U.S. PATENT DOCUMENTS

| | | | |
|---|---|---|---|
| 5,508,801 A | 4/1996 | Panin et al. | |
| 2003/0026457 A1* | 2/2003 | Nahum | 382/106 |

OTHER PUBLICATIONS

S. Yoshida; Interpretation of mesomechanical behaviors of plastic deformation based on analogy to Maxwell electromagnetic theory; Department of Chemistry and Physics, Southeastern Louisiana University, Hammond, La.
S. Yoshida; Physical mesomechanics as a field theory; Department of Chemistry and Physics, Southeastern Louisiana University, Hammond, La.
S. Yoshida; Mesomechanics as a Wave Theory Analogous to Maxwell Electromagnetic Theory; Department of Chemistry and Physics, Southeastern Louisiana University, Hammond, La.
S. Yoshida; Mesomechanies as Wave by Dynamics and Its Applications; Department of Chemistry and Physics, Southeastern Louisiana University, Hammond, La.
S. Yoshida; Consideration on fracture of solid-state; May 10, 2000; Physics Department, University of Florida, LIGO Livingston Observatory, Livingston, La.
S. Yoshida; Observation of plastic deformation wave in a tensile-loaded aluminum-alloy; Research and Development Center for Applied Physics, Indonesian Institute of Sciences, Serpong, Tangerang 15310, Indonesia.
S. Yoshida; Field theoretical approach to deformation of solid state media; Department of Chemistry and Physics; Southeastern Louisiana University, Hammond, La.

* cited by examiner

*Primary Examiner*—Bryan Bui
*Assistant Examiner*—Jonathan Teixeira Moffat
(74) *Attorney, Agent, or Firm*—Jones, Walker, Waechter, Poitevent, Carrere & Denegre, L.L.P.

(57) ABSTRACT

The invention is a method to predict the type of deformation of an object as elastic, plastic or fracture from a time series of specklegram patterns or fringe patterns (the difference of specklegrams). From the recorded patterns, a velocity vector field is calculated. The behavior of the velocity vector, as it evolves in time or space, is used to predict the deformation type. Fracture is predicted at a particular spatial location if the velocity vector file shows the dominate wavelength (or period) as increasing over time at that particular point. Plastic deformation is predicted at a particular spatial location if the maximum excursion of the velocity vector field at that particular location is decaying or distortion tensor parameters begin to depend on locations (they are different at different locations). Elastic deformation is predicted at a particular point if the maximum excursion of the velocity vector filed is approximately constant over time at the particular point or the distortion tensor parameters are constant (do not vary among different locations).

12 Claims, 6 Drawing Sheets

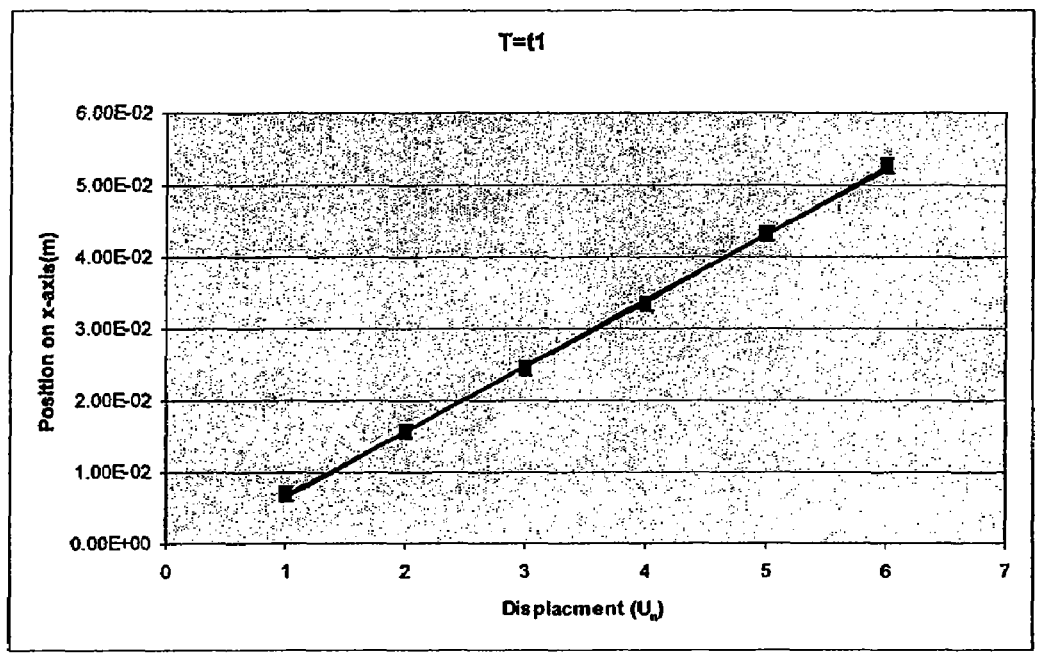
Figure 2(A) Dark fringes U1 through U5's position for 2(a)
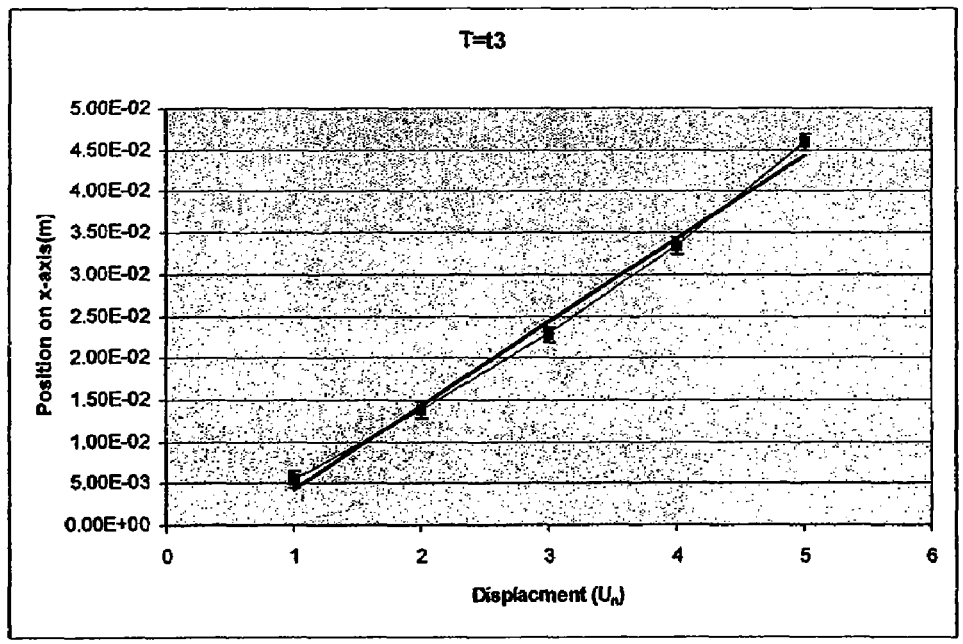
Fig. 2(B) Dark fringes U1 through U5's position for 2(b)
Vertical axis indicates the distance from a reference point in (m) in Figs. 2(A) and 2(B)

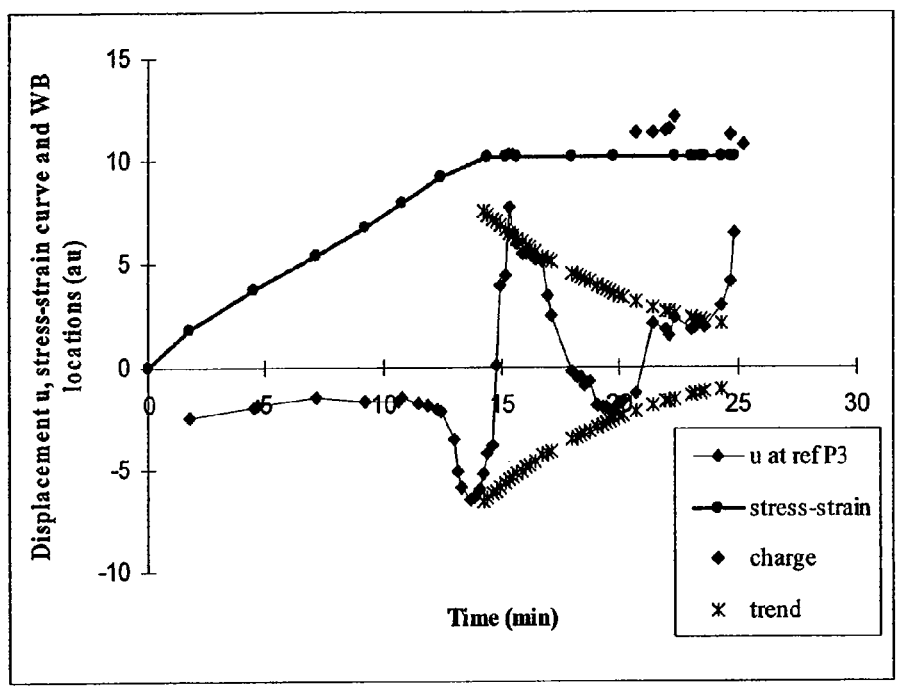
Figure 3: Velocity wave, stress-strain curve and current J. The sample failed at t=24 min. For current J, the vertical axis indicates vertical locations on the sample

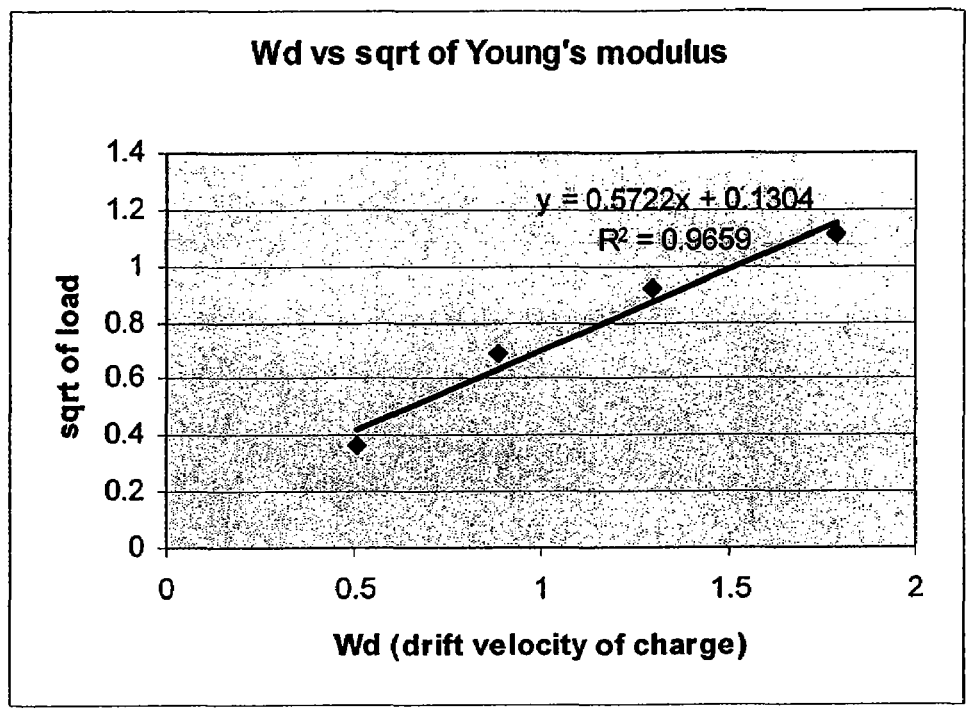
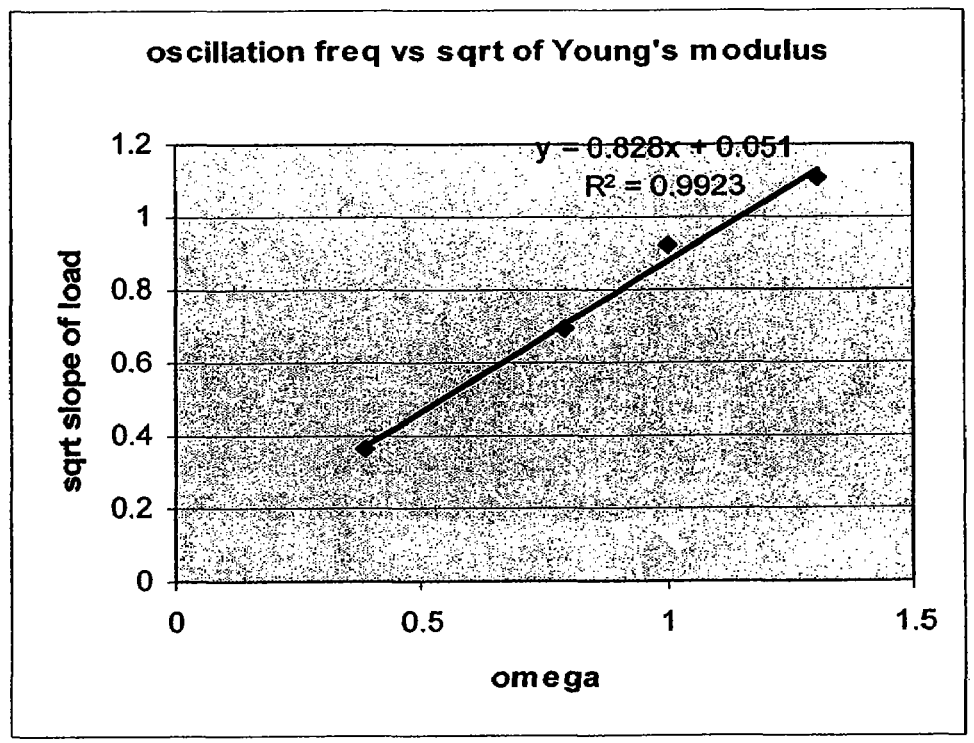
Figure 5: plots of Young's modulus derived from figures 4

METHOD AND APPARATUS FOR ANALYZING DEFORMATION AND PREDICTING FAILURE IN SOLID-STATE OBJECTS

BACKGROUND OF THE INVENTION

Optical path length measurements, made by interferometry, are highly sensitive and adaptable to the study of a wide range of physical phenomena because they sensitively measure small changes in the optical path length induced by physical process, of the order of a fraction of an optical wavelength.

When a material sample is subjected to a perturbation, any resulting changes in the optical path length to an image plane may be potentially sensed by an interferometer. Optical path length variations occurring along the transverse coordinate of the interferometer may be probed to form an interferometric image: the transverse coordinates of the interferometer are defined as occupying orthogonal directions, (x,y) that lie in the image plane. The primary interferometric image produced by the interferometer is called an interferogram. The interferogram is defined as an image formed by the superposition of two beams of coherent light, I1 and I2, on the image plane of the interferometric imaging system. The interferogram is electronically recorded (such as by a digital camera considered to be a generalized imaging device composed of an array of optical sensing elements (or image pixels) operating over the wavelength range used by the interferometer beams) and the information is stored in a data storing and processing system. The interferogram is commonly referred to as a speckle image (or specklegram s(x,y), speckle image and specklegram are used interchangeably) when a coherent light source is used and the object's surface roughness causes random reflection forming speckles on the image plane. When multiple images are taken, for instance of an object in various stages of deformation, each speckle image is considered a frame.

In speckle pattern interferometry, a speckle image of the object before loading or perturbation (henceforth considered as a "deformation") is electronically stored. Next a speckle image of the object after deformation is electronically stored. By taking the difference between the speckle images before and after deformation it is possible to observe a speckle interference fringe pattern. The interference pattern appears as dark and light regions which show the deformation distribution. Hence, interferometry can be used to determine the response of a material to a load or deformation, but it is not particularly useful in analyzing or characterizing the type or degree of deformation of the object or medium, such as elastic deformation, plastic deformation or deformation near the fracture point. Indeed, a fracture generally cannot be predicted until a crack is found in the object. It is not easy to find a crack in its early stage, and in some cases the crack is too large or the fracture point reached when it is found.

What is needed is a technique that enables the diagnosis of the current degree of deformation, to allow prediction on the progress of the deformation, and to predict the location where the material may eventually fracture, without relying on the existence of a crack.

One attempt to formalize a theory of deformation that describes all the stages of deformation inclusively is mesomechanics, developed by Panin et al. [1] V. E. Panin, Ed., *Physical Mesomechanics of Heterogeneous Media and Computer-Aided Design of Materials*, vol.1, Cambridge International, Cambridge, England, 1998 (hereby incorporated by reference). According to this theory, the displacement field of a plastically deforming object is governed by relationships similar to the Maxwell equations for an electromagnet field. Mesomechanics has derived the following relationships:

$$div\vec{V} = \rho/\epsilon \quad (1)$$

$$div\vec{\Omega} = 0 \quad (2)$$

$$curl\vec{V} = \frac{\partial \vec{\Omega}}{\partial t} \quad (3)$$

$$curl\vec{\Omega} = -(1/c^2)\frac{\partial \vec{V}}{\partial t} - \vec{J} \quad (4)$$

where $\vec{V}, \vec{\Omega}$ and $\vec{J}$ are vectors, $\vec{V}$ = rate of displacement vector (a velocity vector)

$\vec{\Omega}$ = rotation or curl of the displacement (it can be defined by equation (3))

$\vec{J}/\mu$ = a quantity that is analogous to the electric current density, where $\mu$ is a material dependent constant, $c = 1/(\epsilon\mu)^{1/2}$ = the phase velocity of the transverse displacement wave where $\epsilon$ = density, $1/\mu$ effective stiffness of shear force $\rho$ = a quantity analogous to electric charge density Divergence of eq. (4) leads to an equation analogous to the charge conservation law or the continuity equation:

$$0 = -1/c^2 \partial \vec{V}/\partial t - div(\vec{J}) \text{ (using equation 1 substitute}$$
$$div\vec{V}) \text{ or } div(\vec{J}/\mu) = -\partial(\epsilon div\vec{V})/\partial t = -\partial \rho/\partial t \quad (5)$$

Equation (4) can also be expressed as $$curl\vec{\Omega}/\mu = -\epsilon\frac{\partial \vec{V}}{\partial t} - \frac{\vec{J}}{\mu} \quad (4')$$

Where $-\vec{J}/\mu$ represents the longitudinal force and $-(1/\mu)curl\vec{\Omega}$ represents the shear force, as explained later.

While mesomechanical theory provides a formalism for deformation theory, the correspondence of the theory's variables to observational data or the conventional theory of elasticity has been lacking. One attempt to develop a formal approach using mesomechanics is that shown in U.S. Pat. No. 5,508,9801 to Panin. This patent, using a mesomechanical theory for interpretation of deformation, utilizes a double exposed hologram to calculate certain velocity tensor parameters. However, Panin does not specify what mesomechanical conditions should be used to predict the evolution of the deformation to fracture and the Panin technique uses a very awkward system to produce the mesomechanical fields.

Panin records a single holograph having a double recorded image (time 1 and time 2). The resultant fringe patterns are displayed by projecting onto a screen. The screen pattern is analyzed to determine the velocity vector field. The Panin technique but uses a multiplier (s/d) applied to the phase component, which is determined by direct measurement from the hologram image displayed by holographic projection onto a screen. Measurements must be undertaken by hand.

SUMMARY OF THE INVENTION

Mesomechanical theory is applied to interfereogramically recorded information using a vector approach to provide the framework for predicting deformation evolution. The methods will provide the capability of acquiring data on a real time basis with a minimum amount of computation so that the diagnosis may be updated as the deformation evolves with as a small interval as desired.

BRIEF DESCRIPTION OF THE FIGURES

FIG. 2A is a plot showing of the movement of the fringes during elastic deformation FIG. 2B is a plot showing the movement of the fringes during plastic deformation FIG 3 is demonstrates time variation of velocity at a particular point on a stressed sample showing the variation in behavior of the velocity function.

FIG. 5 is a plot of the Young's modulus derived from FIG. 4

DESCRIPTION OF THE PREFERRED EMBODIMENT

Figure 1:
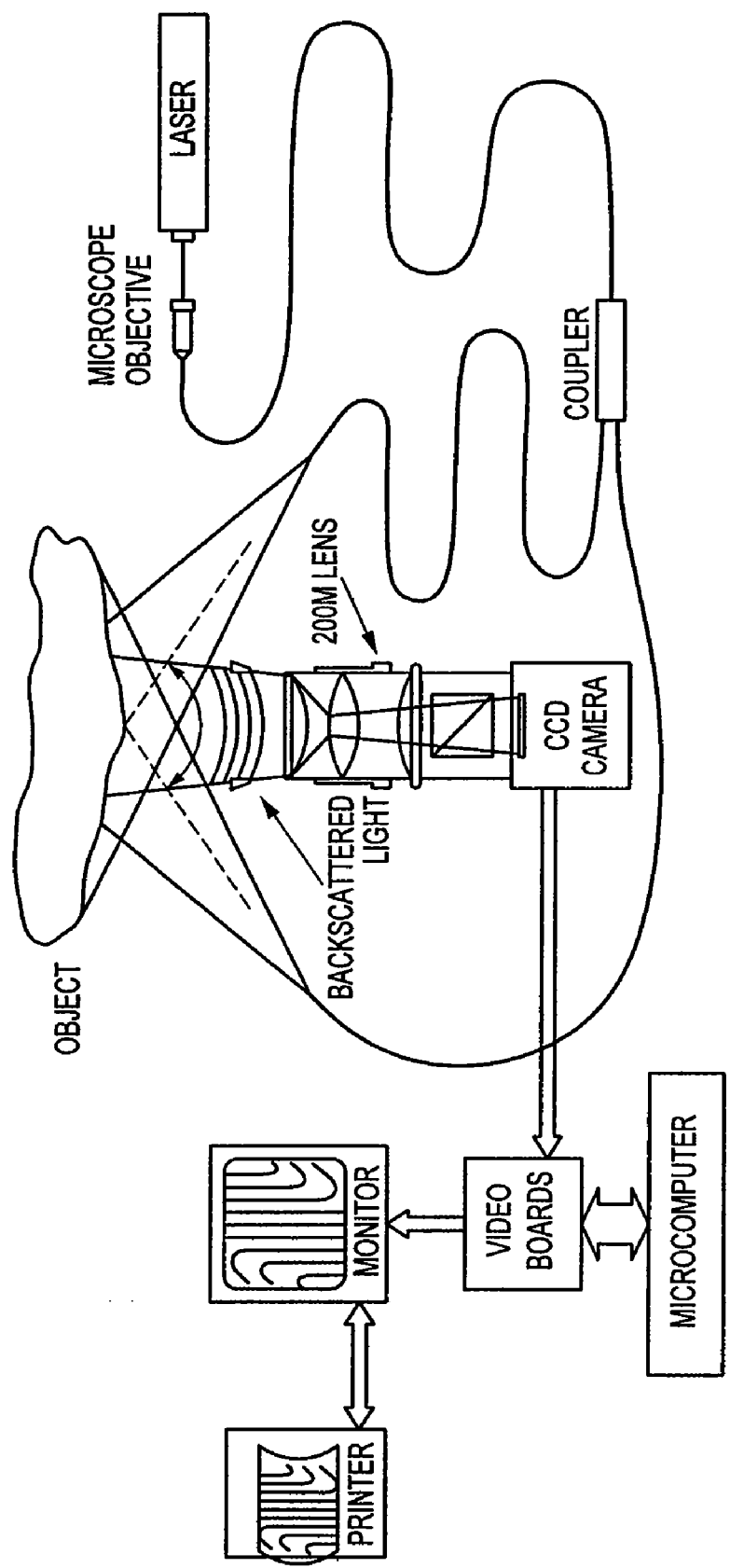
FIG. 1 depicts the experimental set up (in one dimension) to create a specklegram.

This method is applicable to three dimensions S(x,y,z) (using a third interferometer apparatus), but will be described in two dimensions for the sake of simplicity. The raw data used in the present invention are specklegrams recorded along two object planes whose sensitivities are oriented at right angles to each another. The apparatus used to illuminate each object plane includes a two arm in-plane interferometer to illuminate the object and a camera to record the resulting image. The "horizontal" in-plane interferometer apparatus is show in FIG. 1 (now shown is the desired polarization filter). A second interferometer apparatus is set up to record the same object, but in an object plate whose sensitivity is oriented at 90 degrees to the first interferometer apparatus. Hence, "horizontal" ($S_h(x,y)$) and "vertical" ($S_v(x,y)$) speckle images are created (preferably at the same time). A beam splitting device can be used so that the same laser light source be used for both interferometric apparatus, thus ensuring that the both illumination beams have the same frequency and wavelength. However, to avoid possible optical interference between the horizontal and vertical devices, the split beams may be filtered, such as with a polarizing filter, so that the vertical illumination is polarized 90 degrees to that of the horizontal beam.

The primary interferometric image produced by the interferometer is called an interferogram. The interferogram is defined as an image formed by the superposition of two beams of coherent light, I1 and I2, on the image plane of the interferometric imaging system. The interferogram is electronically recorded (such as by a camera considered to be a generalized imaging device composed of an array of optical sensing elements (or image pixels) operating over the wavelength range used by the interferometer beams) and the information is stored in a data storing and processing system. The interferogram is commonly referred to as a speckle image (or specklegram) when a coherent light source is used and the object's surface roughness causes random reflection forming speckles on the image plane. When multiple images are taken, for instance of an object in various stages of deformation, each speckle image is considered a frame.

In speckle pattern interferometry, a speckle image of the object before modification or perturbation (henceforth considered as a "deformation") is electronically stored. Next a speckle image of the object after deformation is electronically stored. By taking the difference between the speckle images before and after deformation it is possible to observe a speckle interference fringe pattern (interchangeably used with "fringe pattern"). The interference fringe pattern appears as dark and bright regions which show the deformation distribution.

A time series of recordation or "frames" of the fringe patterns (each frame representing a fringe pattern, the difference of two specklegrams, preferably adjacent in time) are constructed from the recorded specklegrams. These time series of fringe patterns will be utilized to create a displacement vector field, a velocity vector field and various distortion tensor parameters that will be used to predict the evolution of the deformation wave. The vector fields are created as follows.

Calculation of Vector Fields

Two frames of recorded speckle data, at times T1 and T2 (generally successive frames) from both the x and y orientated apparatus are selected and digitally subtracted to generate a fringe pattern frame (one for each orientation, (e.g., $F_x(x, y)$ and $F_y(x,y)$)). The subtraction is done for each object plane orientation recordation, creating a horizontal fringe pattern $F_x(x, y)$ and vertical fringe pattern $F_y(x, y)$. For each frame the phase is recovered and unwrapped using a suitable phase unwrapping algorithm. The applied algorithm results in an unwrapped phase being established at each point of the x-y plane for the both the vertical and horizontal subtracted phase images, PHASEX(x,y) (generated from the x orientated recorded specklegrams) and PHASEY(x,y) (generated from the y orientated recorded specklegrams). A variety of unwrapping algorithms are known in the art, including the algorithm disclosed in the applicant's 11/248,856 patent application (incorporated by reference). This step results in PHASEX and PHASEY at each point (x,y) of the recorded specklegrams. At each point of the x-y plane, we can then create a vector field (PHASEX, PHASEY)*(illumination wavelength) to get the relative displacement ($\Delta r_x$, $\Delta r_y$) at the point (x,y) between the two selected frames (time T1 and T2). This process is repeated, using frames T2 and T3, T3 and T4, (or some other combination) etc to generate a series of displacement vector fields of ($\Delta r_x$, $\Delta r_y$), showing the evolving movement or deformation of the illuminated object.

Each calculated relative displacement vector frame can be converted to a relative velocity vector frame by dividing the displacements by the time differential between frames, $\Delta t$, ($\Delta r_x/\Delta t$, $\Delta r_y/\Delta t$), or $\vec{V}=(v_x, v_y)$ (or $\vec{V}=(u, v)$ (if desired, the velocity vector filed V can be normalized). The series of relative velocity vector frames $\vec{V}$ can similarly be used to create an acceleration vector field, using $(\Delta v_x/\Delta t, \Delta v_y/\Delta t)$. These vector fields will be used in the mesomechanical analysis as follows.

Using the velocity vector field frames, we can calculate needed quantities, such as $\partial \vec{V}/\partial x$, $\partial \vec{V}\partial y$ (using, as approximations $(\Delta v_x/\Delta x, \Delta v_y/\Delta x)$ etc).

From the continuity equation, (5), $\text{div}(\vec{J}/\mu) = \partial(\epsilon \text{div} \vec{V})/\partial t = \partial \rho/\partial t$, we can put that $\vec{J}/\mu = \epsilon \text{div} \vec{V} * \vec{W}_d = \rho * \vec{W}_d$, where $\vec{W}_d$ is defined as the drift velocity.

For ease of explanation, we will assume a local coordinate system equivalent to the one-dimensional case, that is, that the coordinate systems are orientated so that $v_y = v_z = 0$ (no deformation in the Y or Z direction), hence $\vec{J} = (Jx, 0, 0) \equiv (j, 0, 0)$, $\vec{V} = (v_x, 0, 0) = (\partial r_x/\partial t, 0, 0) \equiv (u, 0, 0)$, where $\vec{R} = (r_x, r_y, r_z) \equiv (\xi, \eta, \zeta)$ is the displacement vector. This corresponds to a local neighborhood coordinate system orientate along the direction of local flow. In this event, $$\frac{j}{\mu} = \varepsilon \frac{\partial u}{\partial x} W_d \quad (7)$$

where $W_d$ denotes the x-component of $\vec{W}_d$. Thus eq. (4') can be written as $$\varepsilon \frac{\partial u}{\partial t} + \varepsilon \frac{\partial u}{\partial x} W_d = \left[ -\frac{1}{\mu} rot \vec{\Omega} \right]_x \quad (4'')$$

where the suffice x denotes the x component of the vector. "Curl" and "Rot" are used interchangeably.

Generally, solutions to this equation can be of the form $$\mu(t, x, y) = \mu_0 e^{i(\omega t - k_1 x - k_2 y)}, \mu_0 = \text{constant (amplitude)}, \text{hereafter, } \mu_0 = 1 \quad (8)$$

By differentiating eq. (4") with respect to time, we can express the dynamic in terms of velocity and its derivatives in the direction of the local velocity.

$$\varepsilon \frac{\partial^2 u}{\partial t^2} + \varepsilon \frac{\partial^2 u}{\partial t \partial x} W_d = \frac{1}{\mu} \frac{\partial^2 u}{\partial y^2} \quad (9)$$

By substituting eq. (8) into eq. (9), the characteristic equation is given as $$(\epsilon \mu)\omega^2 - (\epsilon \mu W_d(k_1 \omega - k_2^2) = 0 \quad (10)$$

A. Elastic Deformation

By applying the Hamilton's principle to a local mass of the medium based on the gauge theoretical approach employed by mesomechanics, a field force analogous to the Lorenz force in electrodynamics can be derived.

$$\vec{F} = q\vec{V} - q\vec{W} \times \vec{\Omega}$$

Here $\vec{V}$ and $\vec{\Omega}$ correspond to the electric and magnetic fields of Maxwell's equation, as eqs. (1)-(4) indicate, and q is a quantity corresponding to the electric charge, whose density is given as $\rho$ above. The first term of this force, which corresponds to the electric force in the Maxwell's formalism, is proportional to the velocity. Thus by nature, it represents a velocity damping force, which causes energy dissipation as the electric counterpart represents energy dissipation known as Ohmic loss.

As mesomechanics explains, the field variables $\vec{V}$ and $\vec{\Omega}$ are introduced to the theory as a compensation field which become necessary to make the Lagrangian (i.e., the theory of dynamics) invariant when the transformation representing deformation becomes dependent on the spatial coordinate (i.e., the local symmetry is requested with the coordinate dependent transformation) (S. Yoshida, "Physical mesomechanics as a field theory" Physical Mesomechanics, (ISSN 1029-9599) Vol. 8, No. 5-6, p. 15-20 (2005) (incorporated by reference). As described in this reference, when the transformation does not depend on the spatial coordinate (i.e, when the transformation is global), rotation $\vec{\Omega}$ represents a rigid body rotation and transformation reduces to the well-known displacement matrix of elastic deformation. In other words, in elastic deformation, rotation is global and $\vec{\Omega}$ does not depend on the spatial coordinates hence $\text{curl} \vec{\Omega} = 0$. Thus a criterion of the evolution to plastic deformation can be defined as $\text{curl} \vec{\Omega} \neq 0$. For the same reason, when the other distortion tensor parameters that characterize elastic deformation (i.e., $\epsilon_{xx} = \partial \xi/\partial x$, $\epsilon_{yy} = \partial \eta/\partial y$, $\epsilon_{xx} = \partial \zeta/\partial z$, $\epsilon_{xy} = (\partial \eta/\partial x + \partial \xi/\partial y)/2$, $\epsilon_{yz} = (\partial \zeta/\partial y + \partial \eta/\partial z)/2$, $\epsilon_{zx} = (\partial \xi/\partial z + \partial \zeta/\partial [x])/2$ known as normal and shear strains) become coordinate dependent, the field variables $\vec{V}$ and $\vec{\Omega}$ that obey equations (1)-(4) appear as compensation fields, and consequently the field forces begin to act on charges. This is consistent with considering the damping force as a quantity analogous to the electric force; in an elastic deformation, the velocity does not represent the compensation effect and hence the field force does not exist. It is also consistent with an experimental observation that slightly before the yield point the transverse dependence of the velocity function becomes non-zero ($\partial u/\partial y \neq 0$).

Thus, elastic deformation can be characterized as $\text{curl} \vec{\Omega} = 0$ or the right hand-side of eq. (4') is zero. In this situation, the characteristic equation (10) leads to $$\omega = k_1 W_d \quad (11)$$

Here $\omega/k_1$ can be interpreted as the phase velocity of the elastic wave, given in the form of $u(t, x, y) = u_0 e^{i(\omega t - k_1 x)}$. Naturally, both $\omega$ and $k_1$ are real numbers because there is no energy dissipation. When $\omega$ and $k_1$ are both real numbers, the $j/\mu$ term in equation (4') becomes proportional to the displacement with a negative sign, i.e., it represents a spring (restoring) force, as shown below.

$$\frac{j}{\mu} = \varepsilon W_d \frac{\partial u}{\partial x} = \varepsilon W_d (-ik_1) u = \varepsilon W_d (-ik_1)(i\omega) \xi = \varepsilon W_d \omega k_1 \xi \quad (12)$$

Further transformation of this equation as below $$\varepsilon W_d \omega k_1 \xi = \varepsilon W_d \omega k_1 \frac{-1}{k_1^2}\frac{\partial^2 \xi}{\partial x^2} = -\varepsilon W_d \frac{\omega}{k_1}\frac{\partial^2 \xi}{\partial x^2}$$

and putting the right hand-side of eq. (4″) set to be zero leads to the more familiar form of the elastic wave equation $$\frac{\partial^2 \xi}{\partial t^2} - W_d \frac{\omega}{k_1}\frac{\partial^2 \xi}{\partial x^2} = \frac{\partial^2 \xi}{\partial t^2} - c_p^2 \frac{\partial^2 \xi}{\partial x^2} = 0 \quad (13)$$

As is well-known, the phase velocity of elastic wave ($c_p$) is given as the square root of the ratio of the Young's modulus to the density. From this, it follows that $\omega/k_1 = W_d = \sqrt{E/\epsilon}$.

As described above, during elastic deformation, the velocity is a non-decaying sine/cosine function. As will be seen below, in plastic deformation, the velocity function decays with time, reflecting dissipative motion. Hence, it is possible to predict the onset of plastic deformation when the velocity function begins to decay in time, in addition to the appearance of non-zero $\text{curl}\vec{\Omega}$.

B. Plastic Deformation

Eq. (12) indicates that $j/\mu$ represents the longitudinal force acting on the local unit volume. In a plastic deformation regime, it is expected that this force is "anti-parallel" (parallel, but of the opposite sign, that, is proportional with a negative coefficient) to the velocity (i.e., it represents a velocity damping force). In this situation, the wave number $k_1$ becomes a complex number, $k_1 = k_1^r + i k_1^i$.

$$\frac{j}{\mu} = \varepsilon W_d \frac{\partial u}{\partial x} = \varepsilon W_d(-ik_1)u = \varepsilon W_d[-i(k_1^r + ik_1^i)]u = \varepsilon W_d k_1^i u - i\varepsilon W_d k_1^r u$$

The first term after the rightmost equal sign corresponds to an exponential decay in the velocity, and represents a damping force. This can be easily seen when eq. (4″) is rewritten in the form of mass times acceleration is equal to the net external force, be possible that the wave number of the transverse wave is a complex number instead, but since the dynamics can be purely longitudinal it is more reasonable to request that the frequency to be a complex number), where the imaginary part $\omega^i$ represents the decay constant, i.e., the wave decays representing energy dissipation, representing irreversible deformation.

$$u(t,x,y) = e^{k_1^i x} e^{i(\omega t - k_1^r x - k_2 y)} = e^{-\omega^i 1} e^{k_1^i x} e^{i(\omega^r t - k_1^r x - k_2 y)} = e^{-(\omega^i t - k_1^i x)} e^{i(\omega^r t - k_1^r x - k_2 y)} \quad (15)$$

Eq. (15) indicates that in a plastic regime the velocity wave has non-uniform amplitude (constant amplitude mentioned above times the factor $e^{k_1^i x}$) in the longitudinal direction. In other words, when an initially uniform material experiences elastic deformation, the longitudinal velocity is not damped. As the deformation enters the plastic regime, the amplitude begins to have a spatial variation and a damped time variation. This is consistent with experimental observations that as the test sample begins plastic deformation, the fringe system representing the rate of the longitudinal displacement becomes non-equidistant. See FIG. 2, reflecting two fringe systems taken from a Young's modulus experiment undertaken during a physics lab course at Southeastern Louisiana University in the Spring of 2006. The fringe system represents the longitudinal velocity. FIG. 2A represents elastic deformation, while FIG. 2B reflects plastic deformation. As can be seen, it is apparent that as the deformation enters the plastic regime, the amplitude spatially becomes non-uniform. FIG. 3 shows the velocity function over time of a plastic deformation. As can be seen, the velocity function is exponentially decaying. Hence, by estimating the envelope curve of the velocity function over time at specified (X,Y) points (the envelope is the curve connects the maximums (minimums) of the velocity), the envelope at a particular (X,Y) point decays over time during plastic deformation (e.g. the exponential decay represents plastic deformation). The envelope should approximate a constant during elastic deformation (no decay), and during plastic deformation, the envelope should show decay. Hence, estimating the envelope decay by picking $q(T) = \text{MAX}(u(X,Y)(t))$ over a time interval P ((i.e., $t=T$ to $t=T+P$) (where P is preferably slightly longer than the wavelength), if $q(T)$ shows decay, then plastic deformation is beginning at point (X,Y) where decay is first indicated. Other measures could be used detect decay, such as $\max(\text{abs}(u(x,y)(T)))$, or $\max((u(x,y)(T))^2)$ over a given time interval.

$$\varepsilon\frac{\partial u}{\partial t} = -\frac{j}{\mu} - \frac{1}{\mu}\text{rot}\varpi = -(\varepsilon W_d k_1^i)u + i\varepsilon W_d k_1^r u - \frac{1}{\mu}\text{rot}\varpi = -(\varepsilon W_d k_1^i)u - \varepsilon W_d \omega k_1 \xi - \frac{1}{\mu}\text{rot}\varpi$$

(a) \quad\quad (b) \quad\quad (c)

The three terms of the external force represent: (a) the damping force; (b) longitudinal recovery force (spring force); and (c) shear recovery force (recovery force proportional to transverse differentiation in displacement), respectively. In this situation, the solution is given as follows.

$$u(t,x,y) = e^{i(\omega t - k_1 x - k_2 y)} = e^{k_1^i x} e^{i(\omega t - k_1^r x - k_2 y)} \quad (14)$$

Eq. (4″) now represents the equation of motion of a system with a complex stiffness and an external force represented by the right hand-side. It leads to a complex frequency $\omega = \omega^r + i\omega^i$. The use of a complex stiffness in the characteristic equation (10) forces the frequency to be a complex number (it may Another way of stating the situation is that the envelope amplitude of the velocity function at a specified (X,Y) point is constant under elastic deformation and decays under plastic deformation (see FIG. 2B showing damped or decaying oscillation).

Substitution of $k_1 = k_1^r + ik_1^j$ and $\omega = \omega^r + i\omega^i$ into characteristic eq. (10) yields $$\epsilon\mu\{(\omega^r)^2 - (\omega^i)^2\}\epsilon\mu W_d(k_1^r \omega^r - k_1^i \omega^i) - k_2^2 = 0 \text{ (from the real part)} \quad (17a)$$

$$-2\omega^i \omega^r + W_d(\omega^i k_1^r + k_1^i \omega^r) = 0 \text{ (from the imaginary part)} \quad (17b)$$

In eq. (15), $k_1^i x - \omega^i t$ represents the motion of the pattern of the non-uniformity, and the ratio $\omega^i/k_1^i = W_d$ can be interpreted as the drift velocity of the charge. As an example, consider a case where the spatial variation is moderate, and eq. (15) can be approximated as follows.

$$u(t, x, y) = (1i + k_1^i x - \omega^i t) e^{i(\omega^r t - k_1^r x - k_2 y)} \quad (16)$$

Here the exponential term representing the spatial and temporal non-uniformity is expanded into polynomials and approximated by up to the linear term. Note that in this context u represents the rate of displacement from the local equilibrium point so the fact that it is not uniform corresponds to a non-equidistant fringe system. (If the locations of dark fringes are plotted as a function of the distance for a reference point of the test sample, the plot is a straight line if the front system is equidistant and the plot deviates from a straight line if the fringe system is not equidistant.)

Figure 6:
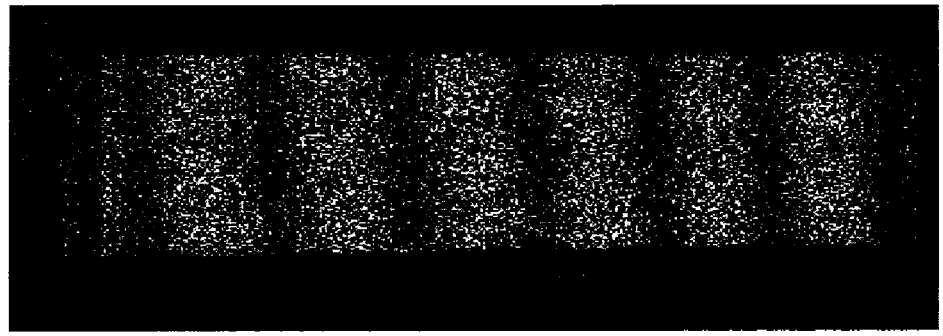
FIG. 6 is speckle interference fringe pattern showing uniform fringes during elastic deformation
Figure 7:
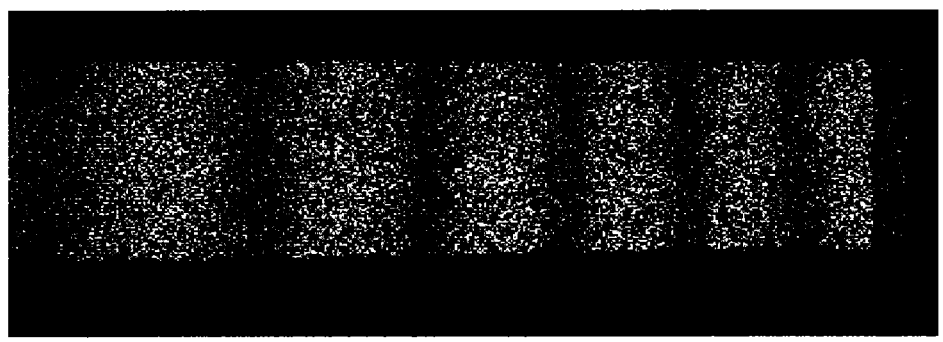
FIG. 7 is a speckle interference fringe pattern showing non-uniform fringes during plastic deformation
Figure 8:
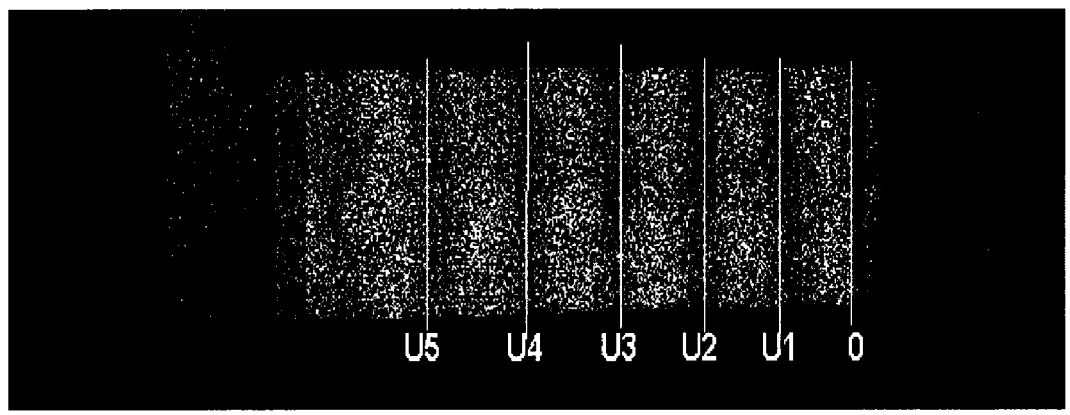
FIG. 8 is a speckle interference fringe pattern of FIG. 7 showing dark fringes U1 through U5.

Quantitative valuation of non-uniformity from the recorded information is demonstrated in FIGS. 6 and 7, and shown plotted in FIGS. 2A and 2B.

The shape of the curves plotted in FIGS. 2A and 2B, that is, the position of dark fringes as a function of distance from a reference point, indicates whether or not the displacement is uniform. If the shape is linear, as is the case of FIG. 2A, the displacement is uniform. If the shape is non-linear (FIG. 2B) the displacement is non-uniform. To undertake this as a computation, one would (a) compute the intensity profile $I(\alpha)$ of the fringe pattern in a direction or axis perpendicular to the fringe (e.g., as shown in FIG. 7, where U1-U5 indicate the location of the dark fringes and $\alpha$ represents such a axis or direction at each time step), (b) plot the locations of minimal of the intensity profile (i.e., find where dark fringes appear) as a function of distance $L(\alpha-\alpha 0)$ along the $\alpha$-axis from a reference point $\alpha 0$ set on the axis (e.g. position marked 0 in Example 3), and predict plastic deformation at a time if the plot deviates from a straight trend line by a predetermined amount (regression analysis can be used to determine if a straight line is a poor fit)—for instance use the $R^2$ value as a predictor of poor fit). Alternatively, we can compute the distance between neighboring dark fringes from the locations of the intensity minima and predict plastic deformation when the standard deviation of the distribution of the distances becomes greater than a predetermined value.

From this viewpoint, the ratio of $\omega^i/k_1^i$ represents the drift velocity of the non-uniformity; as the time goes by the pattern shifts at the rate of $\omega^i/k_1^i$. From mesomechanical viewpoint, non-equidistant fringe system can be viewed as spatial dependent strain ($\epsilon_{xx}$, $\epsilon_{xy}$ etc discussed above).

Putting $\omega^i/k_1^i = W_d$ into (17b) yields $$-2\omega^i \omega^r + W_d(\omega^i k_1^r + k_1^i \omega^r) = -2W_d k_1^i \omega^r + W_d(W_d k_1^i k_1^r + k_1^i W_d k_1^r) = 0$$

So, $-2\omega^r + 2W_d k_1^r = 0$ or $\omega^r/k_1^r = W_d$

This indicates that when the charge drifts, it follows the longitudinal elastic wave at the same velocity. This condition can be explained as the partial breakage of the spring (i.e., the spring constant becomes a complex number at one place after another, most likely at the location of peak displacement, thus the non-uniform distribution due to the breakage follows the displacement wave). When non-uniformity in displacement is concentrated at a certain location of an object, it motion can be interpreted as the phenomenon known as the Lüder's line propagation at the yield plateau or the Portevin-Le Chatelie band propagation at any stage of deformation in general. Our previous experiment (S. Yoshida, H. Ishii, K. Ichinose, K. Gomi and K. Taniuchi, "An optical interferometric band as an indicator of plastic deformation front," J. Appl. Mech., 72, 792-794 (2005)) indicates that a concentrated non-uniformity in distribution longitudinal displacement drifts with the same velocity as the Lüder's line that appears at the same location as the non-uniformed pattern. In ref. S. Yoshida et al. "Direct observation of developed plastic deformation and its application to nondestructive testing", Jap. J. Appl. Phys. Lett. 35, L854 (1996), this type of concentrated non-uniformity in displacement is called the White Band (or "WB") for its appearance on a black-and-white monitor. Since then, a number of authors call the same pattern the white band.

Substitution of the condition $\omega^r/k_1^r = W_d$ and $\omega^i/k_1^i = W_d$ into (17a) yields, $$\epsilon\mu\{(\omega^r)^2 - (\omega^i)^2\} - \epsilon\mu W_d\{k_1^r \omega^r - k_1^i \omega^i\} - k_2^2 = \epsilon\mu W_d^2\}$$
$$(k_1^r)^2 - (k_1^i)^2\} - \epsilon\mu W_d^2\{(k_1^r)^2 - (k_1^i)^2\} - k_2^2 = 0$$

i.e., $k_2 = 0$

This indicates that, when the charge is drifting with the longitudinal wave, there is no wave characteristic in the transverse direction or there is no transverse wave (i.e. $\partial u/\partial y = 0$). This is consistent with experimental observation (see FIG. 4 in Ref. S. Yoshida, B. Siahaan, M. H. Pardede, N. Sijabat, H. Simangunsong, T. Simbolon, and A. Kusnowo, "Observation of plastic deformation wave in a tensile-loaded aluminum-alloy" Phys. Lett. A, 251, 54-60 (1999))

Figure 4A:
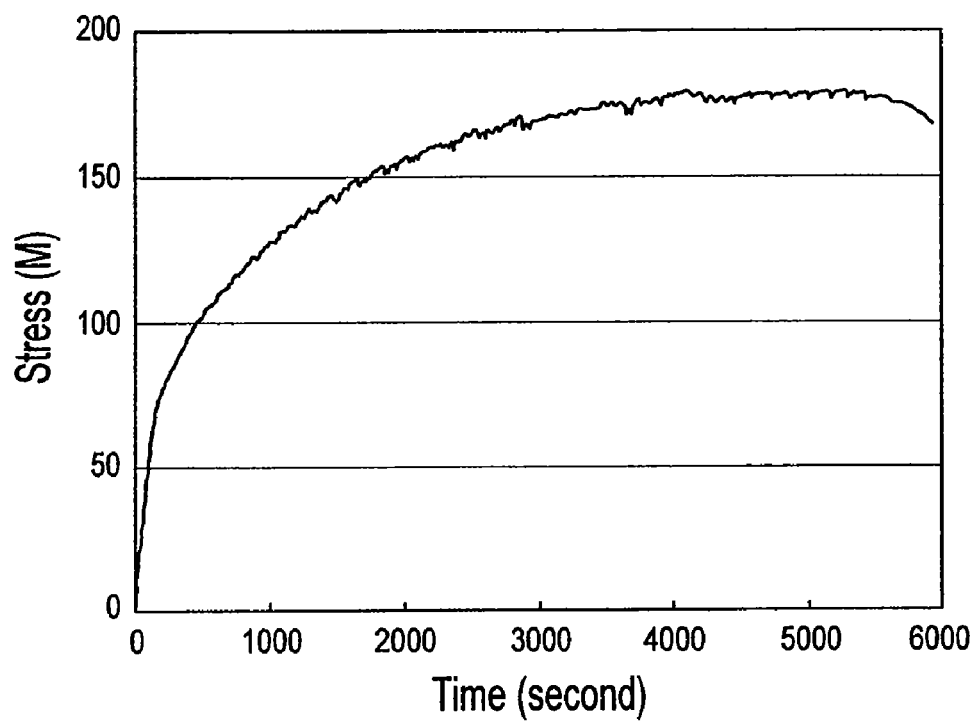
FIG. 4 are graphs showing the stress, pulsation frequency and drift velocity of the white band from a prior art publication.
Figure 4B:
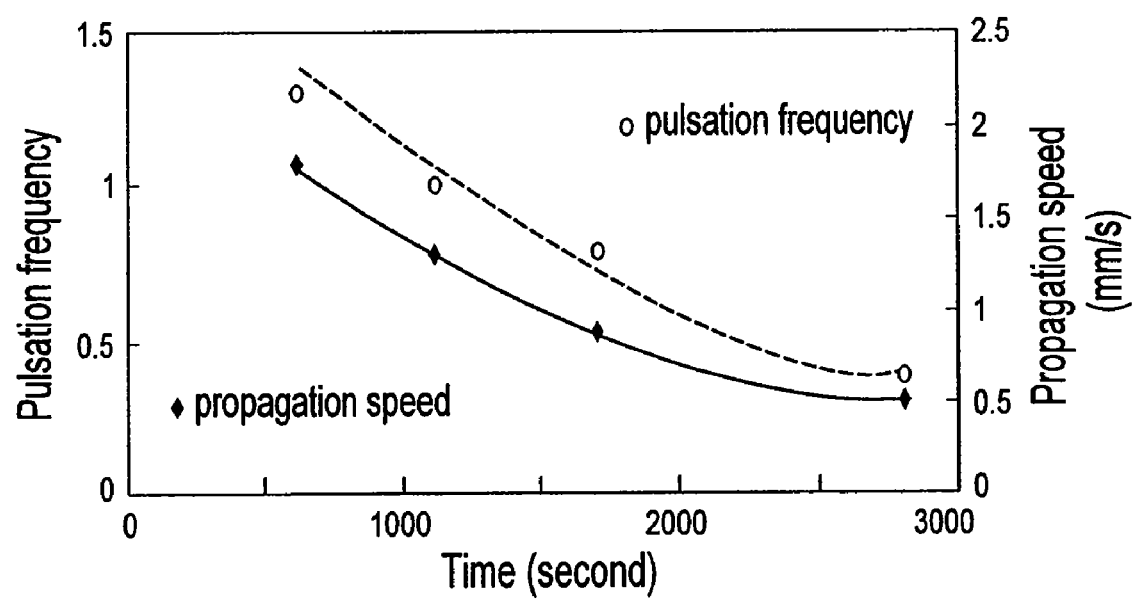

The condition that $W_d = \omega^r/k^r_1$ can be interpreted by $W_d = \omega^r/k^r_1 = \sqrt{E/\epsilon}$. It is expected that as the deformation develops, the Young's modulus decreases, and eventually it becomes zero. At this point, the drift velocity becomes zero and, since there is no restoring force, the velocity becomes dc or the displacement keeps going in the same direction. This represents the fracturing stage. By definition, the Young's modulus is stress (the force per unit cross sectional area) divided by strain (the elongation per unit length), that is, the slope of the stress-strain curve. FIG. 4 shows the stress, pulsation frequency and drift velocity of white band (WB) observed by Toyooka et al. (Satoru Toyooka, Rini Widiastuti, Qingchuan Zhang and Hiroshi Kato, "Dynamic Observation of Localized Strain Pulsation Generated in the Plastic Deformation Process by Electronic Speckle Pattern Interferometry", Jpn. J. Appl. Phys. Vol.40 (2001) 873-876, Part 1, No. 2A. 15 Feb. 2001) FIG. 4a indicates that the sample fails around t=6000 s. FIG. 4b indicates that towards the failure, both $W_d$ and $\omega^r$ decrease.

FIGS. 5a and 5b plots represent the square root of the slope of the cures in FIGS. 4a and 4b respectively (representing Young's Modulus). These figures demonstrate that the Young's modulus is linear with $W_d$ and $\omega^r$, supporting the condition $W_d = \omega^r/k^r_1 = \sqrt{E/\epsilon}$.

Reconsideration of eq. 15

$$u(t, x, y) = e^{k_1^i x} e^{1(\omega t - k_1^r x - k_2 y)} = e^{-\omega^i t} e^{k_1^i x} e^{i(\omega^r t - k_1^r x - k_2 y)}$$

indicates that fracture occurs when $\omega^r = 0$, for when this occurs. Young's modules is also zero, indicating that the applied stress (now also zero) has been relieved due to fracture. This is also consistent with the overall reduction of equation 15 when $\omega^r = 0$, for in this case, equation 15 reduces to $$u(t, x, y) = e^{-\omega^i t} e^{k_1^i x} e^{1(-k_1^r x - k_2 y)} \quad (18)$$

indicating that, as a function of time, the velocity is not oscillating, hence, movement monotonic. Determination of the onset of fracture can be predicted by monitoring the behavior of $\omega^r$. Rewriting eq. 15 using Euler's relationship will make the non-oscillation behavior clearer.

$$u(t, x, y) = e^{-\omega^i t} e^{k^i_1 x} \{\cos(\omega^r t - k^r_1 x - k_2 y) - i \sin(\omega^r t - k^r_1 x - k_2 y)\} \quad (19)$$

Hence, as $\omega^r \to 0$, the period of the velocity approaches infinity while the frequency approaches zero. Hence, the loss of periodicity in the velocity function is an indication of the onset of fracture. Note, the velocity function continues to decay in time even while approaching fracture. Because of this, it may be difficult to detect loss of periodicity if the damping is substantial, as the damping can dominate the behavior of the velocity functions. Noise in the data can also affect the ability to detect variations in the periodicity of the velocity function. An example depicting demonstrating the period behavior of the velocity function can be seen in the data reflected in FIG. 3. As shown in this figure, fracture occurred at time t=23 (min), while the relative loss of periodicity is apparent at time t=21 (min).

In summary, the end of elastic regime is characterized as a non-zero value of $\mathrm{curl}\vec{\Omega}$, the early stage of plastic regime can be characterized as a complex longitudinal stiffness (non-uniform amplitude of the longitudinal wave) and the developed stage can be characterized by the decrease in the drift velocity $W_d$, or equivalently, the decrease in frequency ($W_d = \omega^r / k^r_1$) under the condition that the wave number $k^r_1$ does not change (which is likely in most cases because the wavelength ($2\pi/k^r_1$) is determined by the geometric boundary condition). Additionally, ones of plasticity can be detected by onset of decay in the bounding amplitude of the velocity function. Furthermore, the non-uniformity in the amplitude of the longitudinal wave is accompanied by the appearance of the transverse wave characteristics. Thus, in a practical sense, the appearance of the transverse wave characteristics (i.e., when the velocity component perpendicular to the longitudinal force (that is $\partial u/\partial y$, assuming a locally aligned vector field) begins to show a wave characteristic (i.e. $\partial u/\partial y \neq 0$), or, in the presence of noise, $\mathrm{abs}(\partial u/\partial y) > C$, where C is a suitable constant}, also indicates the onset of plasticity. For the same physical reason, onset of plasticity can be diagnosed as spatial dependency in normal and/or shear strain ($\epsilon_{xx}$, $\epsilon_{xy}$, etc).

The ones of fracture can be predicted by the loss of periodicity (or oscillatory nature) in the velocity field over time. The "degree of loss" of periodicity used to predict fracture can be dependent on the material in question, and can be experimentally found, based upon the degree of confidence desired. Measurement of this loss of periodicity (that is, the period approaches infinity) can be undertaken by a variety of techniques. For instance, as the period (or, if considered as an associated wavelength) grows larger, the velocity approaches a constant (still subject to decay). Hence, detection of the velocity approaching a constant value can be the trigger for predicting fracture, that is $((u(X,Y)(t1) - u(X,Y)(t2)) < c$, for $t2 > t1$ (or the absolute value of this difference), evaluated at particular (X,Y) points of interest. Another method would be to estimate the period $\tau(X,Y)(t)$ (or frequency) of the velocity wave over time (such as by fitting an equation of the form (19) to the velocity data set (at each point (X,Y) of interest)), using suitable regressing techniques) and from the fitted equation, extract the period and predict fracture when the estimated period after time t exceeds a threshold factor of the starting or initial period (such as initial period is doubled or tripled, etc, where the actual factor can be material dependent). instead of fitting a time equation, the velocity vector fields could be Fourier transformed and the period or frequency monitored in the Fourier domain. The behavior of the velocity field, if expanded in a Fourier series, may represent a complex infinite series, in which event, the dominate terms (the terms having the largest amplitudes in the expansion) should be examined to monitor the "wavelength" or "frequency" or "period" and used for prediction purposes. Also, the DC term (i.e infinite wavelength component or zero frequency) in a Fourier expansion could be monitored for prediction purposes (if the DC term is above noise levels, predict fracture, etc). Additionally, the degree of decay can be evaluated from the width of the spectrum; the wider the spectrum the more dissipative. Other techniques to determine the variation in the period/wavelength/frequency will be know to those in the art.

In the above analysis, a local coordinate system was used. In actually, it is not necessary, as certain of the predicted behavior will occur despite the orientation of the coordinate systems. For instance, predicting loss of elastic behavior by using either $\mathrm{curl}\vec{\Omega} \neq 0$ or spatial dependent strains, or the onset of decay in velocity envelope function is independent of coordinate system. Similarly, prediction of the ones of fracture when the velocity function looses periodicity is independent of the orientation of the coordinate system. Additionally, as described, the apparatus used to record the specklegrams was two interferometric apparatus orientated at 90 degrees (orthogonal) to one another. Other angular orientations could be used, and the angular differences accounted for in the computation of the vector fields.

This method can also be used when the applied load is cyclic (such as within an automobile engine). In his case, the specklegrams can be taken at the moment when the amplitude of the displacement is at peaks in order to capture the largest load on the material in question. This can be accomplished by synchronizing the ccd camera with the frequency of the object's motion.

The invention claimed is:

1. A computers implemented method to predict the onset of plastic deformation in a sample from a time series of stored fringe patterns generated using the sample, said method comprising the steps of:
   (a) generating a times series of velocity vector fields from the stored fringe patterns;
   (b) for a selected point, (X,Y), estimate an envelope function of the time series velocity at the point (X,Y);
   (c) determine if the estimated envelope function decays after time T;
   (d) if decay is determined from step (c), predict plastic deformation at point (X,Y).

2. The method of claim 1 further including predicting the onset of fracture near the point (X,Y) if the estimated envelope function, after time T, approaches a constant value.

3. The method of claim 2 wherein said decaying estimated envelope function approaches a constant value after time T, where T represents a particular time, if the absolute value of the difference of the magnitude of the velocity vector at time t and time t+P, for P a predetermined constant, for all t greater than T, is less than a predetermined constant C.

4. The method of claim 1 wherein said time series of velocity vectors is generated from a time series of displacement vectors generated from said stored fringe patterns.

5. A computer implemented method to predict the onset of fracture in a sample from a time series of stored fringe patterns generated using the sample comprising the steps of
   (a) generating a time series of velocity vector fields from said recorded fringe patterns for a selected subset of points {(x,y)};
   (b) for a particular point (X,Y) in said selected subset of points, generate a time series of estimated periods {τ(X, Y)(t)} of the velocity at point (X,Y) from the time series velocity vector fields at the point (X,Y);
(c) predict fracture at the point (X,Y) if the time series of estimated periods is an increasing time series.

6. The method of claim 5 wherein said time series of estimated periods {τ(X,Y)(t)} represents an increasing time series after time T, if τ(X,Y)(t)>C*τ(X,Y)(T) for t>T.

7. The method of claim 6 wherein C is at least 2.0

8. A computer implemented method to predict the onset of fracture in a sample from time series of stored fringe patterns generated with the sample, comprising the steps
   (a) generate a time series of velocity vector fields from said recorded patterns for a selected subset of points {(x,y)}
   (b) for a selected point (X,Y) in said subset of points, generating a time series of estimated frequencies of the velocity at point (X,Y) from said velocity vector time series,
   (c) predict fracture at the point (X,Y) if the time series of estimated frequencies is decaying towards zero frequency.

9. A method to predict the onset of plastic deformation from a stored time series of fringe patterns, comprising the steps of:
   (a) creating a time series of velocity vector fields "u" from said stored patterns
   (b) transforming a subset of the velocity vector field near a particular point (X,Y) to a new coordinate system (r,s) to produce a transformed velocity vector field, where the r direction in the transformed new coordinate system is in the direction of the displacement vector at the particular point (X,Y);
   (c) calculate the rate of change of the transformed velocity vector field in the s direction (Δu/Δs),
   (d) predict the onset of plastic deformation at point (X,Y) if abs (Δu/Δs)>C, where C is a predetermined constant.

10. A method to predict the onset of plastic deformation from a time series of stored fringe patterns, comprising the steps of:
    (a) creating a time series of velocity vector fields from said stored patterns
    (b) for a point (X,Y), calculate a time series q(t), where q(t)=(maximum of the velocity at point (X,Y) between time and time t+P), where P is a predetermined constant;
    (c) for a time T, where T represents a particular time, determine if q(t) decays with time after time T;
    (d) predict plastic deformation at point (X,Y) after time T if decay is determined from step (c).

11. An method to predict the onset of plastic deformation from a time series of stored fringe patterns, each pattern recorded from two differing reference frames x and y, comprising the steps of:
    (a) selecting a fringe from said stored fringe pattern, and a point (X,Y) on said selected fringe,
    (b) along a line perpendicular to the selected fringe and passing through (X,Y), compute an intensity profile;
    (c) identify the first maximum of said intensity profile and assign and the fringe order I=0;
    (d) identify the second local maximum in the intensity profile and assign the fringe order I=1;
    (e) continue identifying local maximum in the intensity profile and assign the nth maximum in the intensity profile the fringe order of I=n−1;
    (f) calculate the distances $d_i$ between each identified local maximum and the local maximum assigned the 0 fringe order;
    (g) fit a straight line to the set of points $(I, d_i)$}
    (h) predict plastic deformation at a point (X,Y) if the error of said fitted line from said fitted line at point (X, Y) exceeds a predetermined value.

12. A computer implemented method to predict the onset of plastic deformation in a sample from a time series of stored fringe patterns generated using the sample, said method comprising the steps of:
    (a) generating a time series of displacement vector fields from the stored fringe patterns;
    (b) for a selected point, (X,Y), calculate the curl of the curl of the displacement vector field near said point;
    (c) predict plastic deformation at point (X,Y) if the calculated value of step (b) is not zero.

* * * * *